Feb. 28, 1956     J. SEJOURNET ET AL     2,736,429
HOT EXTRUSION OF METALS

Filed Sept. 5, 1952     5 Sheets-Sheet 1

INVENTORS.
Jacques Sejournet
Jean Delcroix
BY
Webb, Mackey + Burden
THEIR ATTORNEYS Feb. 28, 1956 J. SEJOURNET ET AL 2,736,429
HOT EXTRUSION OF METALS
Filed Sept. 5, 1952 5 Sheets-Sheet 3

INVENTORS.
Jacques Sejournet
Jean Delcroix
BY
Webb, Mackey & Burden
THEIR ATTORNEYS Feb. 28, 1956   J. SEJOURNET ET AL   2,736,429
HOT EXTRUSION OF METALS
Filed Sept. 5, 1952   5 Sheets-Sheet 5

INVENTORS.
Jacques Sejournet
Jean Delcroix
BY
THEIR ATTORNEYS

United States Patent Office 2,736,429
Patented Feb. 28, 1956

2,736,429

HOT EXTRUSION OF METALS

Jacques Sejournet, Paris, and Jean Delcroix, L'Isle Adam, France, assignors to Comptoir Industriel d'Etirage et Profilage de Metaux, Paris, France, a corporation of France Application September 5, 1952, Serial No. 308,064

Claims priority, application France November 8, 1951

1 Claim. (Cl. 207—10)

This invention concerns hot extrusion of metals in an extrusion type press.

Hot extrusion of metals is generally made by means of hydraulic presses comprising substantially a container into which is placed the metal billet to be transformed, a die, adaptable to one end of said container, and the opening of which represents the section of the part to be obtained by extrusion, and a ram or punch which enters the container and presses against the end of the billet opposite that presented before the die and which transmits to said billet the force developed by the press, so as to force through the die the metal of the billet.

The die is held in a die-holder and various arrangements help, in the usual presses, to apply the die and its holder against the corresponding end of the container, and to disassemble them at the end of operation.

To carry out extrusion of a sectional part, more particularly with an irregular section, one generally proceeds as follows:

The die and die-holder are first applied against the container, closing one of its ends. The metal billet to be transformed being placed in the container, against the die, power is applied at the other end of the billet, by means of the ram. The metal then flows through the die opening. At the end of the operation, a small portion of the billet, commonly called a discard remains attached to the extruded portion.

The extruded portion should then be separated from the discard to be removed and have the die cleared. For this purpose, a movable equipment carries, out of the press and along its axis, the die, the die-holder, the extruded portion and the discard. Clutches seize the discard sidekise, and a further back motion of the movable equipment disengages a small length of the extruded portion. The extruded part is then sawn off, between the die and the discard, and the extruded portion, once sawn off, passes again through the die in order to be entirely released.

The same method may be used, for round bars and tubes, but, in general, other and simpler devices are preferred, which need not be described here.

Generally speaking, all methods for separating the extruded portion from the discard, after extrusion, have various drawbacks, particularly when complicated shaped products are dealt with, or in case of high temperature extrusion. Indeed, the sawing of an article with a complicated shape, most often entails a slight deformation thereof, and the forming of burrs, which makes it difficut for the sawn off portion to pass through the die. Furthermore, when dealing with metals extruded at a high temperature, the lubricant used, offering the required qualities during extrusion will be at a lower temperature during the operations just described and its lubricating function is generally no longer sufficient to let the discard be cleared off or the extruded portion pass through the die.

The applicant has found that the clearing of the die, with a view to separating the discard from the extruded portion, can be more easily carried out when the discard, after the extruding operation, remains attached to the container rather than to the die. He has found that this adhering to the container could be obtained, in particular, by using a removable ram nose or dummy block with a radial clearance in the container of about 0.1% to 0.6% of its diameter and comprising one or more circular grooves on its cylindrical surface, and one or more longitudinal grooves on its cylindrical surface and/or on its front surface, the circular and longitudinal grooves being simultaneous or separate, and their sections being of any shape, constant or variable. Experience showed that such grooves facilitate indeed the linking of the discard to the dummy-block, and that the adherence of the discard to the container is thus improved.

The present invention, by which can be avoided the above mentioned drawbacks, therefore concerns a method for clearing the die, with a view to separating the discard from the extruded part in hot extrusion of metals. This method consists, on the one hand, in having the discard adhering to the container at the end of the extruding operation, preferably by using a dummy-block as above described, and, on the other hand, in performing the separation of the discard, at the end of the extruding operation, as follows: first, the die and the container, to which the discard remains attached are moved apart from each other; the discard is separated from the extruded part to be sawn off; then the discard, once sawn off, still remaining stuck inside the container, the die and the container are brought relatively near one another so that the discard, the front portion of which offers the same section as the die, acts as a ram for pushing the extruded portion through the die, then the die and container are moved relatively apart so as to clear the discard from the die and finally the discard and the dummy-block are ejected from the container by means of the ram itself.

The adherence of the discard to the container is obtained preferably, in accordance with the invention, by using a removable dummy-block having circular and/or longitudinal grooves and offering a radial clearance in the container, of about 0.1 to 0.6% of its diameter, as hereabove indicated.

The invention will be described in greater detail hereinafter with reference to the appended diagrammatic drawings, in which.

On the various figures, the same elements are indicated by the same reference numerals.

Figure 1:
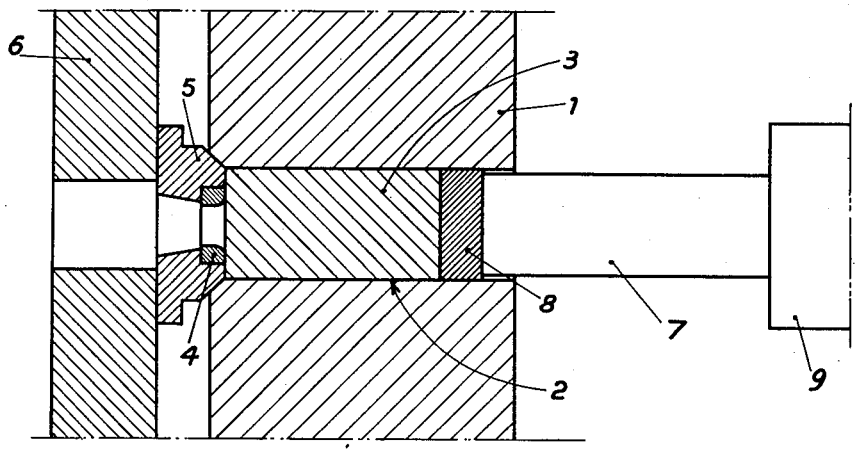
Fig. 1 is a view, in longitudinal section, of the whole set of container, die and ram in an extrusion press of the usual type, at the beginning of an extruding operation.

In the diagrammatic form shown here, the extrusion press comprises a container 1 provided with a cylindrical cavity 2, for receiving the metal billet 3 to be transformed by extrusion; a die 4, the opening of which corresponds to the section of the part to be obtained by extrusion, is supported in a die-holder 5, latched itself by a latch 6 and liable to be shifted axially with respect to the container 1 by means of a slide block (not shown), this whole set enabling one to apply as tight as possible, the die against the container, or to draw them apart from each other. At the end of the container 1, opposite to that upon which the die is applied, a ram 7 enters. This ram is provided with a dummy block 8 and subjected to the action of press-ram 9.

To extrude a part by means of such a press, the previously heated metal billet 3 to be extruded is placed in the container 1, the die 4 being applied on the latter (Fig. 1); the ram 7 is then set working on the billet 3, so as to force the metal through the die 4, which causes the formation of a sectional part 10 (Fig. 2), the cross section of which corresponds to that of the die-opening.

Figure 2:
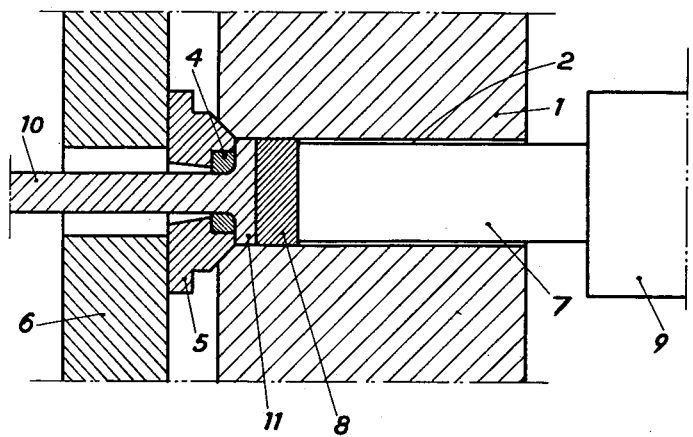
Fig. 2 is a similar view, at the end of the extruding operation.

This above operation is interrupted when only a very small portion of the billet 3 remains in the container and it is such a small portion, called discard, which is represented at 11 in Fig. 2.

To clear the die, extruded part 10 must be separated from discard 11.

Figure 3:
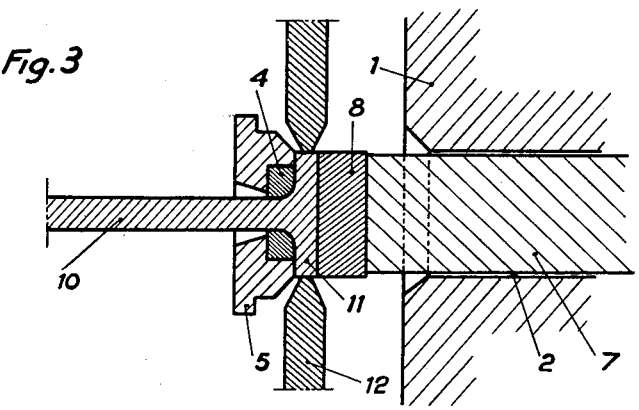
Figs. 3 to 5 are three views, in longitudinal section showing the successive stages in a common operation for separating the discard from the extruded part.
Figure 4:
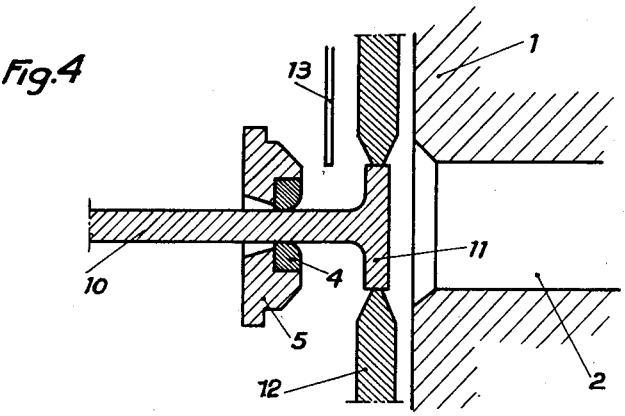
Figure 5:
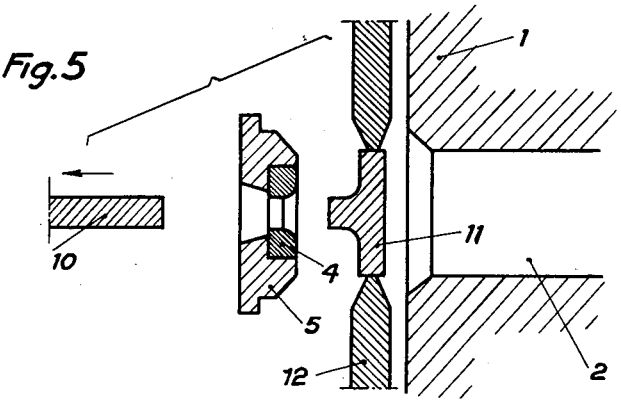

The slide block being made free to move with respect to the container 1, the discard 11 is pushed out of the latter by means of the ram 7; the whole set of die 4 and die holder 5 being carried along in this motion and moving apart from the container 1 (Fig. 3.) The discard 11 is then seized by means of clutches 12 and held motionless, while the slide block is shifted still further from the container 1, a portion of the extruded section 10 passing again through the die (Fig. 4). By means of a saw 13, the sectional part 10 is cut off from the discard 11, then by a traction exerted on the sectional portion by means of devices not shown in the drawings, the die 4 is cleared by extracting the portion of the sectional part 10 engaged therein (Fig. 5.) Difficulties arise in this latter operation particularly when extruding products of a complicated shape.

To obviate these difficulties, in accordance with the invention, the separation of the extruded sectional part 10 from the discard 11 and clearing of the die are carried out without removing the discard from the container. For this purpose, a special removable dummy-block is preferably used to secure adherence of the discard to the container. This dummy-block enters the container with a lateral clearance of about 0.1 to 0.6% of its transversal dimension, and is provided with grooves on one or more of its surfaces.

Three types of embodiment of such a dummy-block are shown in Figs. 6 to 11.

Figure 6:
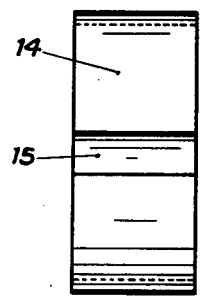
Figs. 6 and 7 are two respectively profile and front views of an example of embodiment of a dummy-block in accordance with the invention.
Figure 7:
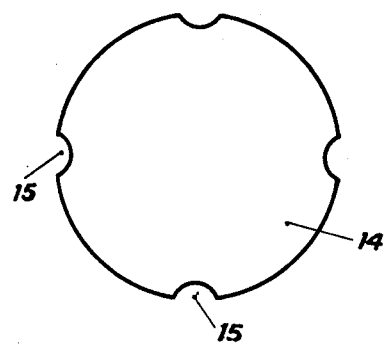

The block represented in profile in Fig. 6 and viewed from the front in Fig. 7 consists of a cylindrical part 14, limited by two plane terminal faces and in the side surface of which are cut grooves 15 having a cross section in the shape of a circular arc, extending along the generatrices of the cylindrical part.

Figure 8:
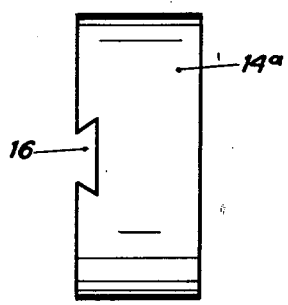
Figs. 8 and 9 are two similar views of a modified embodiment.
Figure 9:
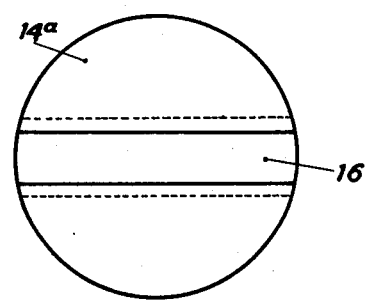

In the example shown in Figs. 8 and 9, the lateral surface of the cylindrical part 14a constituting the dummy-block, according to the invention, is smooth, but the surface of the terminal face of the block which is to contact the billet to be extruded is provided with a diametral groove 16, which is dovetailed in cross section.

Figure 10:
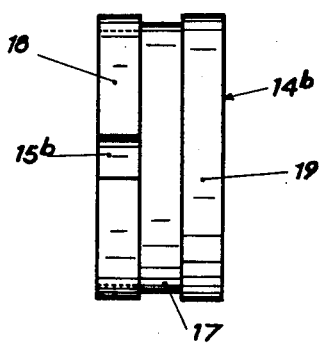
Figs. 10 and 11 are two similar views of another modified embodiment.
Figure 11:
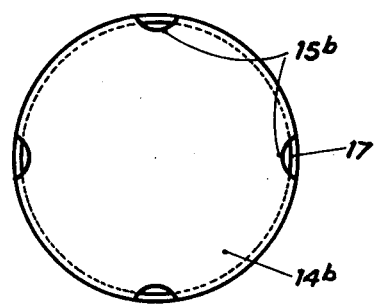
Figure 12:
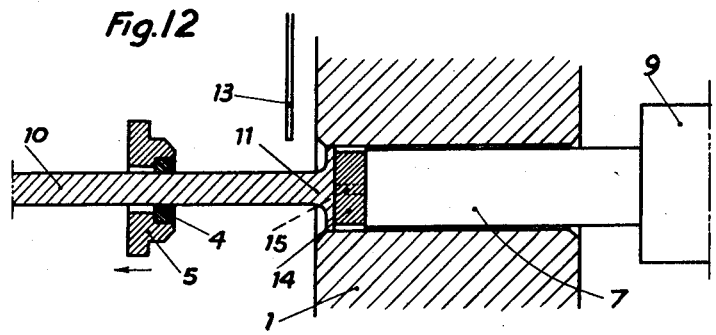
Figs. 12 to 15 are four views, similar to those of Figs. 1 and 2, showing the successive stages of a first embodiment of a clearing operation of the die, in accordance with the invention.
Figure 13:
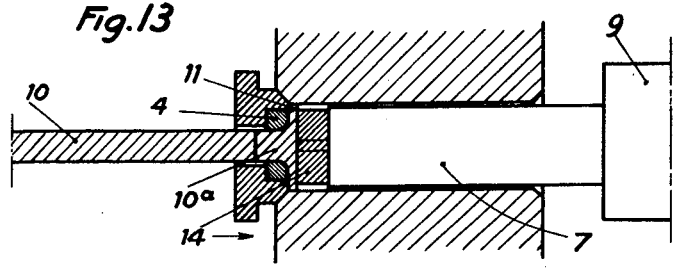
Figure 14:
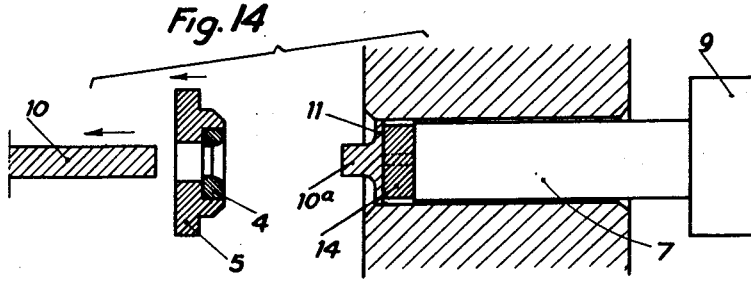

Figs. 10 and 11 show a type of particularly desirable embodiment. In this type of embodiment, the cylindrical part 14b of the dummy-block, has plane end faces, but its side surface is cut with a circular groove or throat 17 on either side of which the side surface forms a protruding portion 18 or 19. In the protruding portion, 18, which is on the side of the block which comes in contact with the billet, are provided grooves 15b, parallel with the generatrices of block 14b.

It will be realized that other arrangements of grooves may be used within the scope of the invention, the types of lateral and frontal grooves, in particular, may be used in combination, so long as these types of grooves give the desired effect of increasing the suitable adherence between the discard and the container.

During an extruding operation, the dummy-block 14, 14a, 14b being interposed between the ram and the billet, which is in the container, the metal of the billet, under the pressure exerted by the ram and the block flows backwards, entering the grooves 15, 16 or 17 cut in said block. As a result, at the end of the operation, when the metal of the billet cools down, the discard which remains in the container adheres thereto and to the dummy-block. This adherence is strong enough to let one proceed to the clearing of die, such as described hereinafter, but it can be overcome by exerting a pressure on the dummy-block, by means of the ram, for forcing the discard out of the container.

The extrusion operation proper is carried out in the usual manner, as described above, the dummy-block 14, according to the invention, being inserted between the ram 7 and the billet 3.

Clearing of the die may be performed in various manners, according to whether the slide block is shifted with respect to the container or, on the contrary, the container is shifted with respect to the slide block.

Figs. 12 to 15 relate to a type of embodiment of the first method, while Figs. 16 to 19 illustrate the second method. In these figures, for greater simplicity, the slide block has not been shown.

Figure 15:
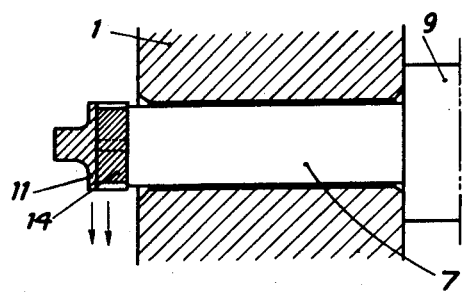

In the operation method shown in Figs. 12 to 15, once the extrusion operation is over, the die 4 is drawn away from the container 1 (Fig. 12), so as to disengage the portion of the extruded part 10, which is in the vicinity of the discard 11. During this motion, the discard 11 remains sticking to the container, as set forth above. The sectional part 10 is then cut by means of the saw 13, then the die 4 is brought closer to the container 1 (Fig. 13), the length of the portion 10a of the sectional part 10 remaining associated with the discard 11, having been designed so that the saw cut passes through the die 4. There is now only to remove the sectional part 10, which is thus free, and to again draw apart the die (Fig. 14), which may be removed longitudinally or sidewise, then to act on the ram, for forcing out of the container the whole set formed by the dummy-block 14 and the discard 11 adhering thereto (Fig. 15).

Figure 16:
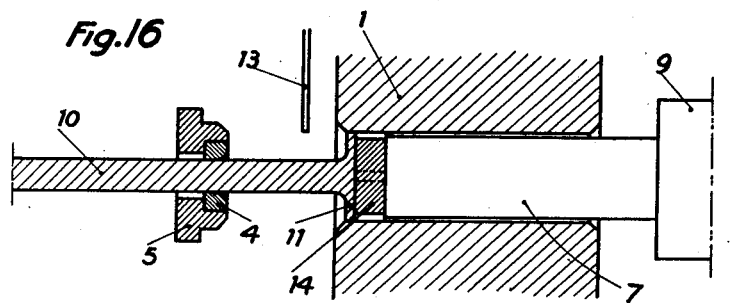
Figs. 16 to 19 are four views, similar to those of Figs. 12 to 15, and relative to a modified operation.
Figure 17:
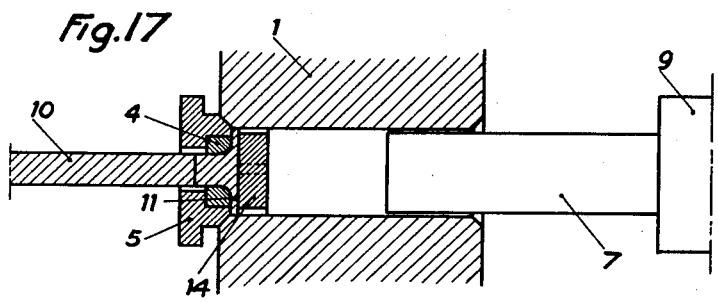
Figure 18:
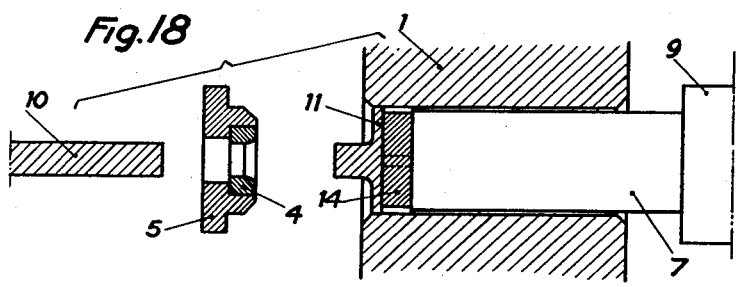
Figure 19:
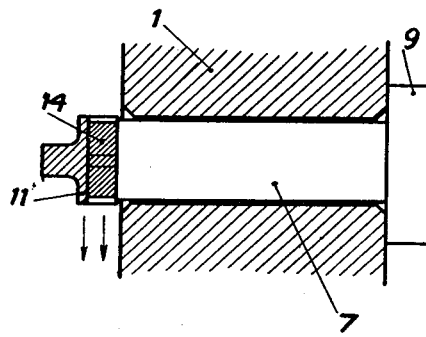

In the operation method represented in Figs. 16 to 19, at the end of extrusion, the ram 7 and the container 1 are first moved back, the die 4 remaining fixed, and the sawing is carried out (Fig. 16). Then, with the discard 11 still adhering to the container 1, as described, the container 1 is shifted towards the die 4 so as to force through the latter the extruded portion 10 (Fig. 17) which may then be removed. A new backward motion of the container 1 enables to completely clear off the die 4 and to remove the die-holder and die either longitudinally or sidewise (Fig. 18), after which, by pushing in the ram 7, the discard 11 and the dummy-block 14 are expelled (Fig. 19).

What I claim is:

In the hot extrusion of metals wherein a heated billet is placed in a container, a dummy block is placed in the container at the rear of the billet, the billet is extruded through a die located at the front end of the container by a ram entering the rear end of the container to form an extruded article and to leave a discard portion of the billet and the dummy block in and adhered to the container, the die and container are moved axially apart while the discard portion and dummy block adhere to the container, the extruded article is severed between the die and container to provide a stub on the discard projecting from the container and the dummy block and discard are ejected from the container, the improved method of removing from the die the extruded article which has been severed from the discard, which comprises moving the container with the discard and dummy block adhered thereto and the die closer together until the stub acting as a ram on the severed extruded article disengages it from the die, and thereafter moving the die and container apart to disengage the discard and stub from the die.

References Cited in the file of this patent

UNITED STATES PATENTS

| | | |
|---|---|---|
| 974,195 | Seifert | Nov. 1, 1910 |
| 1,935,286 | Born | Nov. 14, 1933 |
| 2,210,157 | Young, Jr. | Aug. 6, 1940 |

FOREIGN PATENTS

| | | |
|---|---|---|
| 21,006 | Great Britain | 1907 |
| 21,947 | Great Britain | 1907 |
| 316,259 | Great Britain | Sept. 4, 1930 |
| 337,300 | Great Britain | Oct. 30, 1930 |